A. P. GREER.
LOOM PULLEY HUB.
APPLICATION FILED DEC. 29, 1921.
1,436,032. Patented Nov. 21, 1922.
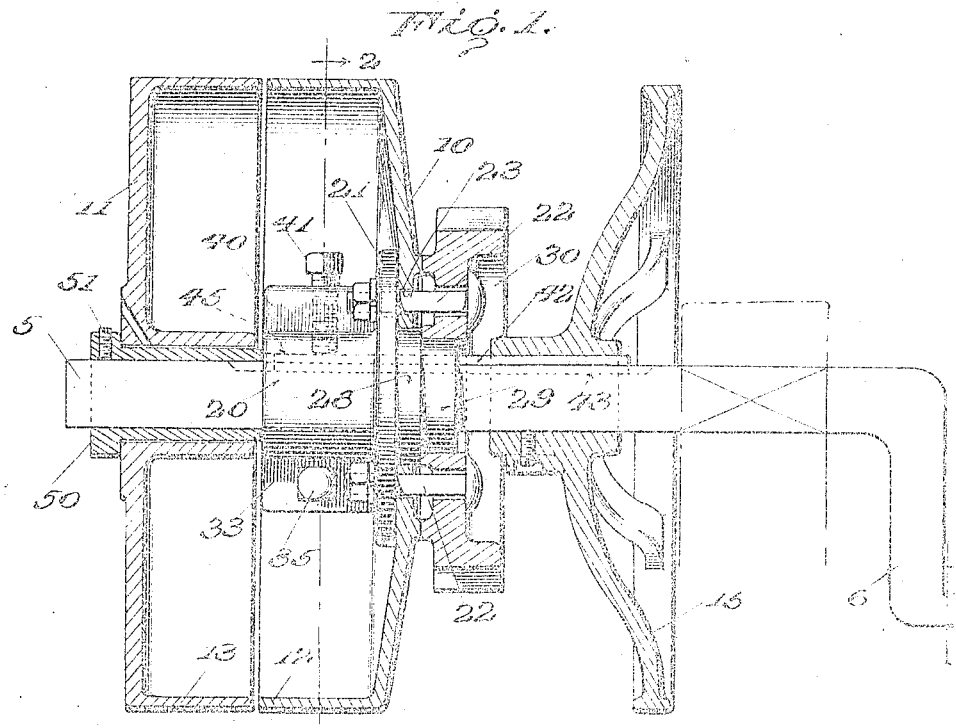
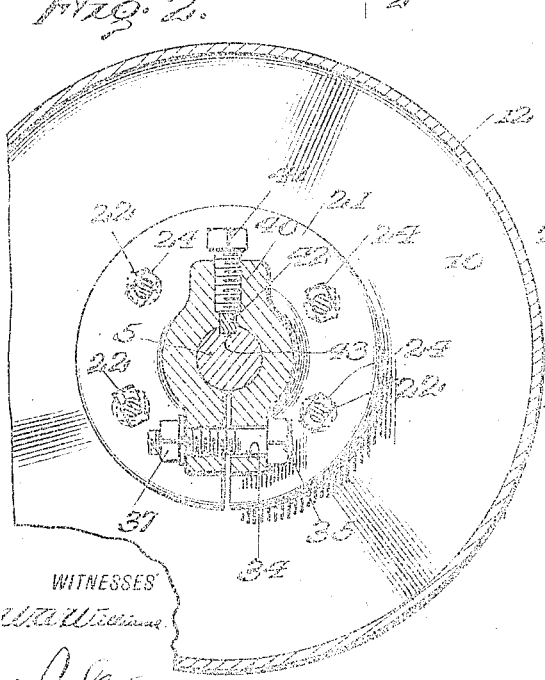
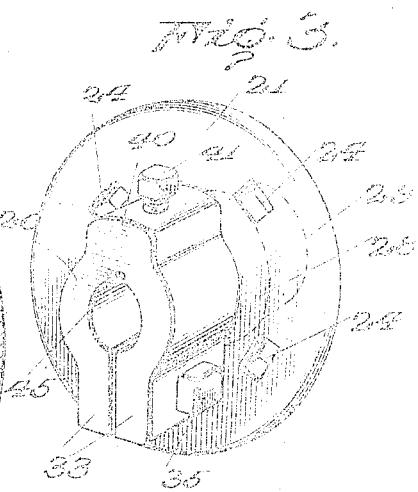
WITNESSES
INVENTOR
A. P. Greer
BY
ATTORNEYS Patented Nov. 21, 1922.

1,436,032

UNITED STATES PATENT OFFICE.

ARCH P. GREER, OF GREENVILLE, SOUTH CAROLINA.

LOOM-PULLEY HUB.

Application filed December 29, 1921. Serial No. 525,625.

*To all whom it may concern:*

Be it known that I, ARCH P. GREER, a citizen of the United States, and resident of Greenville, in the county of Greenville and State of South Carolina, have invented certain new and useful Improvements in Loom-Pulley Hubs, of which the following is a specification.

This invention relates to pulleys especially adapted for use on looms.

In the operation of looms the periodical strains borne by the main crank shaft serve to loosen the connection between the drive pulley and the crank shaft so that frequent replacements must be made. Therefore, an important object of this invention is to provide novel means to compensate for this rapid wear on the crank shaft and the drive pulley so that the necessity of frequently replacing the various parts associated with the crank shaft is overcome.

Further the invention aims to provide a drive pulley for looms which may be conveniently applied and conveniently adjusted as required.

Other objects and advantages of the invention will be apparent during the course of the following description.

In the accompanying drawing forming a part of this application and in which like numerals are employed to designate like parts throughout the same.

Figure 1 is a fragmentary side elevation of the crank shaft equipped with the drive pulley and other associated parts.

Figure 2 is a vertical transverse sectional view taken on line 2—2 of Figure 1.

Figure 3 is a perspective of a hub embodied in the invention.

In the drawing wherein for the purpose of illustration is shown a preferred embodiment of the invention, the numeral 5 designates the usual crank shaft of a loom, the said crank shaft being provided with cranks 6 to which the pitman rods are connected in the usual and well known manner.

As illustrated in Figure 1 the drive pulley 10 is mounted on the crank shaft at one side of the loose pulley 11 and the drive pulley is provided with the usual rim 12 about which the drive belt is trained. The loose pulley 11 is also provided with a rim 13 of the same diameter as the rim 12 and onto which the pulley is forced when it is desired to stop the loom. Also the usual brake wheel 15 is keyed or otherwise secured on the crank shaft 5 and forms a means whereby the loom may be stopped by the automatic braking mechanism, all of which is old and well known in the art.

The invention forming the subject matter of this application resides in the particular means for securing the drive pulley on the shaft so that the wear of the parts may be compensated for as the occasion requires. In carrying out the invention I provide a hub 20 which is split longitudinally and is mounted on the shaft. The split hub is provided with a radially split annular attaching flange 21 adapted to be secured flatly and securely in engagement with the inner edge portion of the annular web of the drive pulley. Fastening devices in the nature of bolts 22 are extended through openings 23 in the web of the pulley and are extended through openings 24 in the flange 21. With reference to Figure 3 it will be observed that the openings 24 through which the bolts are extended are somewhat elongated so that the adjustment of the hub will not be interfered with by the flange. That is to say by making the openings 24 of a size to freely receive the bolts 22 the flange 21 may move with relation to the bolts when the hub 20 is tightened.

One side of the hub is provided with a reduced portion 28 extended through a centrally arranged opening in the web 10 and the said hub is further reduced as indicated at 29 and is extended through the central portion of the head gear 30. The head gear 30 operates the cam employed in connection with the harness of the loom and functions in the old and well known manner. It will be seen that the bolts 22 are also extended through the head gear 30 whereby to secure the head gear flatly in engagement with the adjacent side of the drive pulley. The bolts 22 therefore serve as a means for connecting the hub 20, the drive pulley 10 and the head gear 30 so that these parts operate as a unit.

The split hub 20 is provided with flat radially projecting ears 33 having apertures 34 for the reception of an adjusting bolt 35. With reference to Figure 2 it will be seen that one of the apertures 34 is screw threaded for engagement with the screw threads of the bolt 35. This forms a convenient means whereby the ears 33 may be drawn together for firmly clamping the hub in engagement with the shaft. When the ears 33 have been drawn together to the desired extent a jam nut 37 may be tightened on the bolt 35 whereby to hold the bolt in a set position and prevent the accidental loosening of the same.

The side of the hub 20 opposite the radial ears 33 is formed with a radial longitudinally extending projection 40 having a threaded opening through which a set screw 41 is extended. The set screw 41 bears against a key 42 and thereby holds the key within the longitudinally extending key way 43 in the shaft and the longitudinally extending key way 45 in the hub. However the set screw 41 is not tightened until after the hub has been securely clamped to the shaft by means of the fastening bolt 35.

When it is desired to take up the wear on the crank shaft the loose pulley 11 may be removed and access afforded to the bolt 35 and the set screw 41. The loose pulley 11 which is mounted on a bushing 50 may be conveniently removed by releasing the set screw 51 carried by the extended end of the bushing. The hub 20 which extends into the pulley and is surrounded by the rim 12 may now be tightened so as to effectively take up the wear on the shaft and the hub, which wear is as previously stated caused by the uneven pull and the excessive strains imparted to the crank shaft at various periods in the operation of the loom.

It will be seen that the improved hub by reason of its location entirely within the pulley does not necessitate the rearrangement of the head gear 30 or other parts mounted on the crank shaft. Also the particular location of the hub renders the same highly accessible when it is desired to make an adjustment.

Should the inventive idea involved in this application be carried out in connection with drive pulleys of the style now in use, it is merely necessary to cut away the hub of the drive pulley and substitute the hub herein disclosed.

With reference to Figure 1, and also Figure 3, it will be seen that the ears 33 and adjusting screw 41 are located entirely at one side of the flange 40 so that the head gear 30 will not interfere with the clamping of the hub on the shaft.

It will be noted that the improved hub may be secured on the worn part of an old shaft, which old part is located at a point spaced from one end of the shaft. In the use of the ordinary pulley the same must be made more or less oversized so as to fit over the end of the shaft which is not worn and when it is desired to secure the pulley on the worn part of the shaft a close fit can not be obtained.

Having thus described the invention what I claim as new and desire to secure by Letters Patent is:—

1. In a loom, the combination of a split hub having a pair of radially projecting ears, an adjusting bolt freely passed through one of the ears and threaded through the other ear whereby to form a means whereby the hub may be tightly clamped about the crank shaft of the loom, a jam nut threaded on said adjusting bolt and forming a means for holding the bolt in position, the side of said hub opposite said ears being formed with a longitudinally extending radially arranged projection provided with a threaded opening, a set screw threaded through said last named opening and constituting a means for forcing a key in position, said hub being provided at one end of said projection with a split annular flange having elongated openings, a drive pulley having a web flatly engaged with one side of said flange, fastening bolts extending through the web of said pulley and through the elongated openings in said flange whereby to detachably connect the pulley to the flange, said pulley being provided with a rim surrounding said hub, one end of said hub being formed with a reduced portion adapted for engagement with the head gear of the loom.

2. A power transmitter consisting of a hub having an annular flange, a pulley having a web connected to said annular flange, said hub being provided with ears, an adjusting device connected to said ears and forming a means for securing the hub tightly in engagement with the shaft of a loom, and means cooperating with said adjusting device in securing the hub on a loom.

3. In a loom, the combination with a split hub having radial ears provided with openings, an adjusting device extending through said openings, said hub being provided with an annular flange split radially, a pulley having a web secured flatly in contact with said flange, and means cooperating with said adjusting device in securing the hub on the shaft of the loom.

4. In a loom, the combination of a split hub having a pair of radially projecting ears, an adjusting bolt freely passed through one of the ears and threaded through the other ear to form a means whereby the hub may be tightly clamped about the crank shaft of a loom, the side of said hub opposite said ears being formed with a longitudinally extending radially projecting member provided with a threaded opening, a set screw threaded through said last named opening, a key extended through said hub and engaged by said set screw, said hub being provided with a split annular flange, and a drive pulley having a web secured flatly in engagement with said flange.

ARCH P. GREER,